Figure 1:
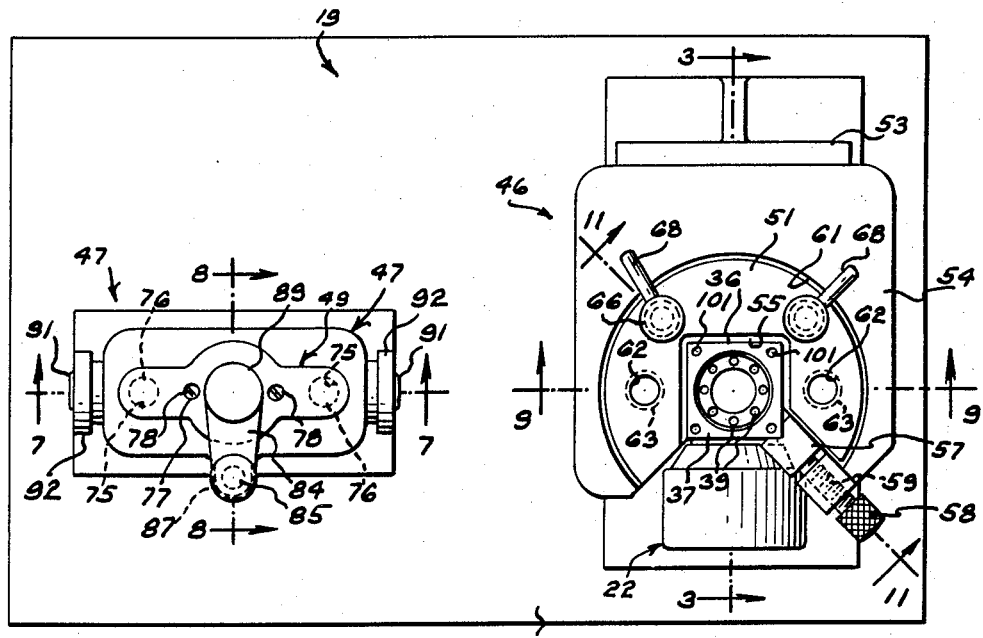

Dec. 8, 1959  C. PAULSON  2,915,807
FIXTURE FOR ASSEMBLING AND ALIGNING
COMPONENTS OF A MAGNETRON
Filed May 27, 1954  3 Sheets-Sheet 1

INVENTOR
C. PAULSON
BY C.B. Hamilton
ATTORNEY

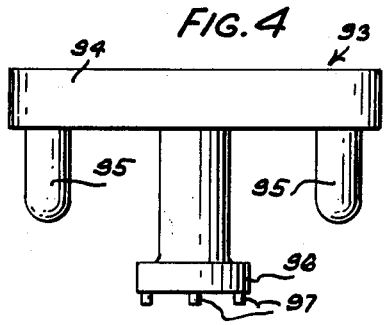
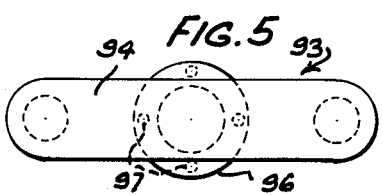
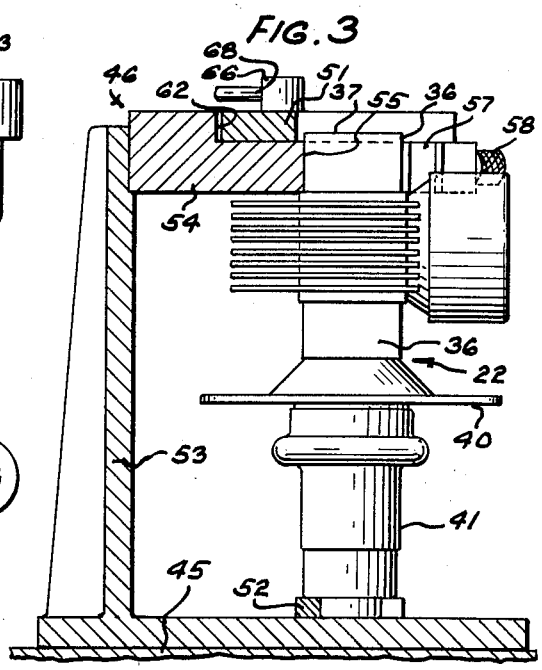
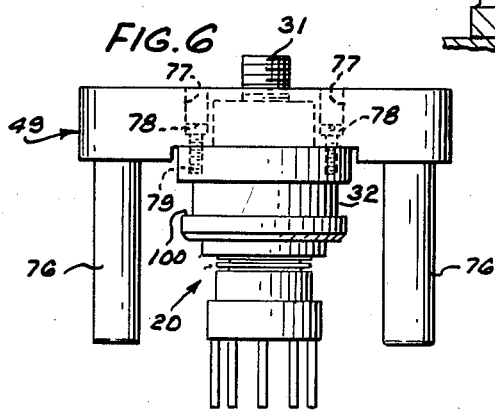
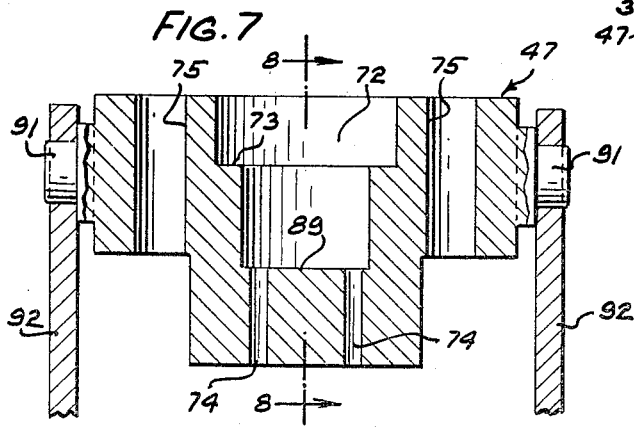
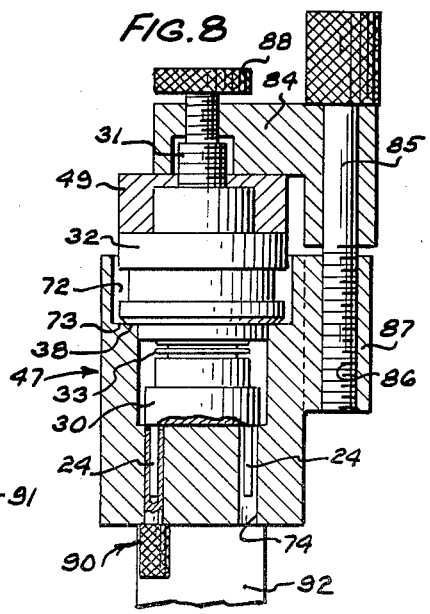

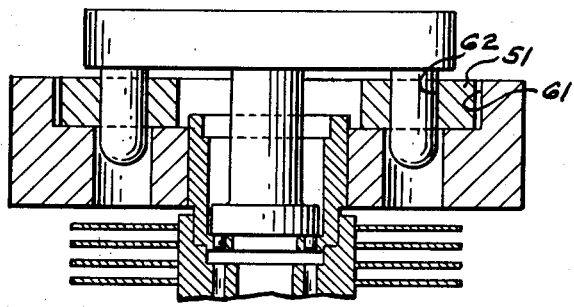
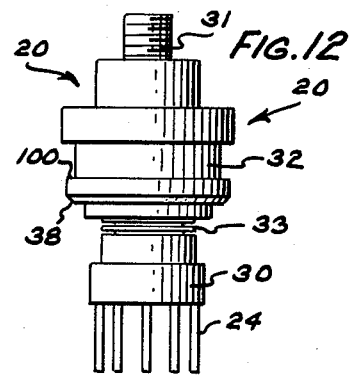
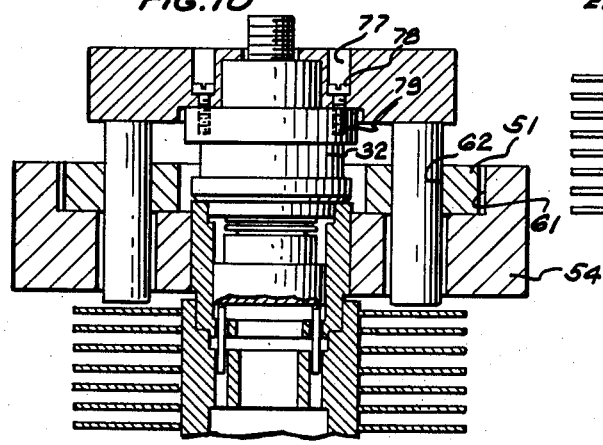
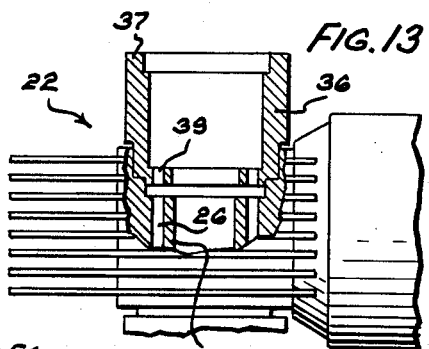
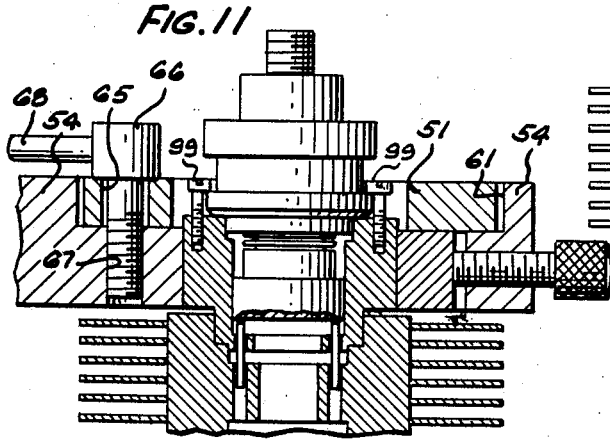
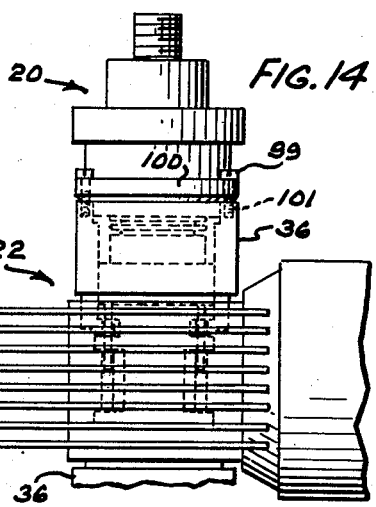

United States Patent Office 2,915,807
Patented Dec. 8, 1959

2,915,807

FIXTURE FOR ASSEMBLING AND ALIGNING COMPONENTS OF A MAGNETRON

Christian Paulson, St. Paul, Minn., assignor to Western Electric Company, Incorporated, New York, N.Y., a corporation of New York Application May 27, 1954, Serial No. 432,772

5 Claims. (Cl. 29—25.19)

This invention relates to a fixture for assembling and aligning components of a magnetron and more particularly to a device for accurately positioning a plurality of parallel pins on the tuning unit of a magnetron in coaxial alignment with cylindrical apertures in the body of a magnetron.

An object of the invention is to provide a device for assembling and aligning components of a magnetron.

Another object of the invention is to provide an improved fixture for assembling a component having a plurality of pins with one having a plurality of apertures and for aligning the pins coaxially with the apertures.

A further object of the invention is to provide a device for assembling interfitting parts of an article having an aligning element simulating portions of one of the parts being assembled for receiving another of the parts and having means for aligning the other part in a predetermined position thereon.

A still further object of the invention is to provide a transfer member applicable in a predetermined position to an aligning member on which one part of a pair of interfitting parts is aligned for removably securing said one part thereto for movement with the transfer member to a predetermined position on another aligning member on which another part is aligned for positioning said one part in a predetermined alignment on the other part.

A device illustrating certain features of the invention as applied to a fixture for assembling and aligning a tuning unit component of a magnetron having a plurality of pins with a body component having a plurality of cylindrical apertures for receiving the pins may include an aligning element having a plurality of parallel cylindrical pin apertures arranged in precisely the same relative position as the apertures in the magnetron for receiving the tuning unit with the pins thereof in the pin apertures. The pins of tuning unit are coaxially aligned in the pin apertures of the insertion of aligning sleeves engageable with a pair of the pins and the walls of the pin apertures, after which a transfer member having a pair of pilot pins, slidably engageable in a pair of pilot recesses in the aligning element, is applied to the aligning element and the tuning unit is secured thereto by a pair of screws. A holder for supporting the magnetron body has a pilot plate adjustably mounted thereon which has a pair of pilot apertures for receiving the pilot pins on the transfer member, and a gage having a pair of pilot pins engageable with the pilot apertures and having a plurality of aligning studs engageable in the pin apertures of the aligning element and in the pin apertures of the magnetron body is applied to the movable pilot plate with the studs of the gage in engagement with the pin apertures of the magnetron body to accurately position the pilot plate with the apertures thereof in predetermined oriented relation to the pin apertures of the magnetron body, after which the pilot plate is locked in oriented position, the gage removed therefrom, and the transfer member with the tuning unit attached thereto is applied to the magnetron body with the pilot pins of the transfer member guided and accurately positioned by the pilot apertures in the pilot plate to effect the precise assembly of the tuning unit on the magnetron body and the coaxial alignment of the tuning pins in the tuning pin apertures.

Figure 2:
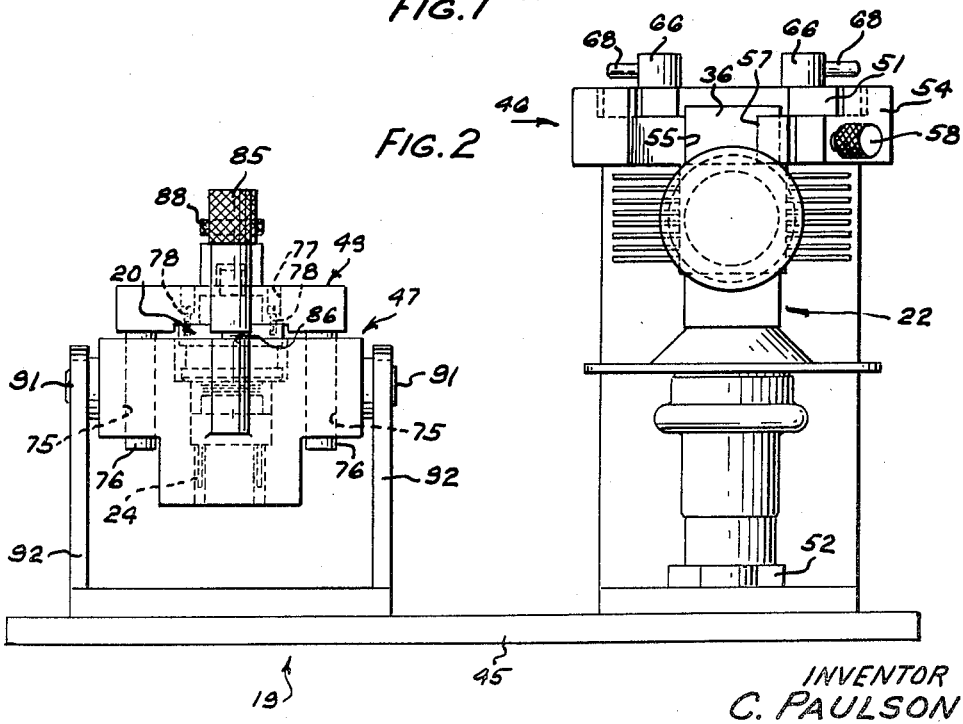

Other objects and advantages of the invention will be more fully understood by reference to the following detailed description and the accompanying drawings illustrating a preferred embodiment thereof, in which Fig. 1 is a plan view of the assembling fixture;
Fig. 2 is a front elevational view of the fixture;
Fig. 3 is a vertical cross-sectional view of the fixture taken along the line 3—3 of Fig. 1 and showing the magnetron body in position therein;
Figs. 4 and 5 are side and bottom views, respectively, of a gage member of the fixture;
Fig. 6 is a vertical longitudinal sectional view of a transfer member and showing, in dotted lines, a tuning unit component secured thereto;
Fig. 7 is a fragmentary cross-sectional view of the master aligning element taken on the line 7—7 of Fig. 1 with parts omitted;
Fig. 8 is a vertical cross-sectional view through the master aligning element showing a tuning unit supported in position therein and taken on the line 8—8 of Figs. 1 and 7;
Fig. 9 is a fragmentary vertical sectional view through the fixture taken along the line 9—9 of Fig. 1 and showing the magnetron body holder and the gage member associated therewith;
Fig. 10 is a fragmentary vertical sectional view similar to Fig. 9 showing the transfer member supporting the tuning unit in aligned relation to the magnetron body;
Fig. 11 is a fragmentary vertical sectional view taken along the line 11—11 of Fig. 1 showing the tuning unit supported in aligned relation to the magnetron;
Fig. 12 is a side elevational view of the tuning unit of the magnetron;
Fig. 13 is a fragmentary side elevational view of the magnetron body; and
Fig. 14 is a side elevational view of the magnetron body with the tuning unit secured thereto in assembled relation.

The present fixture 19 (Figs. 1 and 2) is designed to facilitate the assembly of two components of a magnetron electronic tube, a tuning unit 20 (Fig. 12) with the magnetron body 22 (Fig. 13), and the accurate positioning of the tuning pins 24 on the tuning unit in coaxial alignment with the cylindrical apertures 26 in an anode 27 of the magnetron body. The tuning pins 24, which are arranged in a circle and in parallel relation to each other, are secured to a head 30, which has a stem 31 slidably mounted for movement in a cylindrical member 32. A bellows 33 has one end thereof sealed to the head 30 and the other end sealed to the member 32.

The magnetron body 22 (Figs. 2 and 3) has a pair of spaced-apart rectangular pole pieces 36 on opposite sides of the anode, the upper one of which is recessed to receive the tuning unit 20, and has a flat end surface 37 forming a shoulder engageable with a rabbeted seat 38 on the cylindrical member 20 for supporting the tuning unit 20. The tuning pins 24 fit within the cylindrical apertures 26 of the anode 27 and through aligned apertures 39 formed in an annular internal flange on the upper pole piece. The diameter of the aligned apertures 26 and 38 is greater than that of the tuning pins 24 and it is essential that the tuning unit 20 be assembled to the magnetron body 22 with the tuning pins 24 in coaxial alignment with the apertures 26 and 39. As indicated in Fig. 3, the magnetron body 22 also has a mounting plate 40 and a tubular extension 41.

The fixture 19 comprises a base 45, on which are mounted a holder 46 for supporting the magnetron body 22 in an upright position and a master aligning element 47 or holder for aligning the tuning unit 20 therein in a predetermined position. The fixture also includes a transfer member 49 (Figs. 2 and 6), which is receivable in the master aligning element 47 in a predetermined position and has means for securing the aligned tuning unit 20 thereto whereby the transfer member 49, with the tuning unit 17 secured thereto, may be removed from the aligning element 47 and applied to the holder 46 for cooperation with an adjustable pilot plate 51 thereon for supporting the tuning unit 20 in accurately aligned position relative to the magnetron body 22.

The holder 46 comprises a support 52 mounted on the base 45 and forming a seat for receiving the end of the tubular extension 40 to support the magnetron. A bracket 53 mounted on the base has a horizontally disposed plate 54 fixed thereto, which is provided with a rectangular recess 55 for receiving the upper pole piece 36 of the magnetron body. The upper pole piece is clamped against a pair of adjacent side walls of the recess 55 by a clamping jaw 57, which is actuated by a screw 58 mounted in a threaded aperture 59 in the plate 54. The pilot plate 51 which is C-shaped is mounted on the plate 54 in a recess 61 for limited horizontal movement relative thereto and has a pair of cylindrical pilot apertures 62 (Figs. 2, 9, and 10) disposed in the arms thereof on opposite sides of the recess 55. A pair of clearance apertures 63 are formed in the plate 54 below the pilot apertures 62. The pilot plate 51 has a pair of clearance apertures 65 for receiving the shanks of a pair of headed locking screws 66 (Figs. 2 and 11), which engage threaded apertures 67 in the plate 54 and have handles 68, by means of which the locking screws may be actuated to clamp the pilot plate 51 in adjusted position.

The master aligning element 47 has a central recess 72 (Fig. 7) for receiving the tuning unit 20 therein and has an annular shoulder 73 engageable with the seat portion 38 of the member 32 of the tuning unit for supporting it for limited lateral movement and the aligning element 47 has a plurality of parallel cylindrical tuning pin apertures 74 which have the same arrangement and spacing as the apertures 26 in the anode 27 of the magnetron body 22 for receiving the tuning pins 24 therein. A pair of pilot apertures 75 having the same diameter and the same spacing as the pilot apertures 62 of the pilot plate 51 are provided in the aligning element 47 for receiving a pair of pilot pins 76 on the transfer member 49.

The transfer member 49 is recessed to receive the upper portion of the member 32 of the tuning unit 20 and has clearance apertures 77 for a pair of screws 78, which are engageable in threaded apertures 79 in the member 32 for securing the tuning unit 20 to the transfer member. The clearance apertures 77 are sufficiently large to permit the alignment of the screws 78 with the threaded aperture 79 in the member 32.

The tuning unit 20 is adapted to be inserted in the aligning element 47 with the tuning pins 24 disposed in the tuning pin apertures 74, as shown in Fig. 8, after which the transfer member 49 is applied to the aligning element 47 with the pilot pins 76 engaging the pilot apertures 75 and the transfer member is moved into engagement with the member 32, in which position it is clamped by an arm 84. The arm 84 is mounted for swinging movement on a headed adjusting screw 85, the threaded shank of which engages a threaded aperture 86 in a boss 87 on the aligning element 47. An adjusting screw 88 carried by the arm 84 is engageable with the stem 31 of the tuning unit 20 and may be actuated to press the stem 31 and the head 30 thereon into engagement with the bottom 89 of the recess 72 in the aligning member 47.

Before the screws 85 and 88 are turned to clamp the tuning unit 20 against the aligning element 47 and while the tuning unit 20 is movable therein, a pair of tubular aligning members 90 (Fig. 8) are inserted between a pair of diametrically opposed tuning pin apertures 74 and the tuning pins 24 therein. The tubular portions of the tools 90 slidably engage the inner surface of the aperture 74 and the outer periphery of the tuning pins 24 and serve to accurately align the tuning unit 20 relative to the aligning element 47 with all of the pins 24 coaxially aligned with their respective tuning pin apertures 74. To facilitate the insertion of the tubular members 90 the aligning element 47 may be rotated through one half turn about a pair of trunnions 91 formed on the element 47 and supported in a pair of brackets 92 mounted on the base 45. After thus aligning the tuning unit 20, the locking screws 85 may be operated to cause the arm 84 to clamp the transfer arm 49 and the member 32 of the tuning unit against the shoulder 73 and the locking screw 88 may be operated to clamp the head 30 of the tuning unit against the surface 89 of the aligning element. The tuning unit 20 is then secured to the transfer member by inserting the screws 78 into the apertures 77 and screwing them into the threaded apertures 79 in the members 32.

The pins 24 may be straightened in parallelism with each other in the aligning element 47 in the manner disclosed in a co-pending application on a device for and method of aligning pins on an article, Serial No. 432,727, filed May 27, 1954, now Patent No. 2,861,620, issued November 25, 1958. The clamping screws 85 and 88 may then be loosened and the arm 84 rotated through one half turn, after which the transfer member 49, with the tuning unit 20 attached thereto, may be removed from the master aligning element 47.

A gage 93 (Figs. 4 and 5) is provided having a cross arm 94, to the ends of which are secured a pair of pilot pins 95, which are spaced apart and of a diameter which snugly fit in the pilot apertures 75 in the master aligning element 47 and also fit in the pilot apertures 62 in the pilot plate 51 of the holder 46. The gage 93 has a head 96 thereon disposed between the pilot pins 95 and which carries a plurality of four short cylindrical gage pins or studs 97 which snugly fit into four of the tuning pin apertures 74 of the aligning element 47 and into four of the apertures 39 in the upper pole piece 36 of the magnetron body 22 (Fig. 9). The pilot pins 95 of the gage 93 are thus disposed in a predetermined oriented relation to the aligning pins 97.

With the clamping screws 66 loosened and the pilot plate 51 free to move on the holder 46, the gage member 93 is applied to the holder 46 with the pilot pins 95 in engagement with the pilot apertures 62 of the plate 51 and with the aligning pins 97 on the head 96 in engagement with the apertures 38 in the upper pole piece 36 of the magnetron body 22 to adjust the pilot plate 51 with the pilot aperture 62 thereof in a predetermined oriented relation to the apertures 39 and 26 of the magnetron body 22. The screws 66 are then actuated to lock the pilot plate 51 in adjusted position. The gage 93 is then removed from the holder 46, and the transfer member 49 with the tuning unit 20 attached thereto is then removed from the aligning element 47 and applied to the holder 46 and the magnetron body 22, as shown in Fig. 10, with the pilot pins 76 of the transfer member disposed in the pilot apertures 62 in the pilot plate 51. The transfer member 49 guided by the pilot apertures 62 thus serves to guide and support the tuning unit 20 in properly aligned relation to the magnetron body 22 and with the tuning pins 24 coaxially aligned with the cylindrical apertures 26 of the anode 27. The tuning unit 20 is then secured to the magnetron assembly 22 by four screws 99 (Fig. 14), the heads of which engage the circular shoulder 100 of the member 32 and the threaded shanks of which engage threaded apertures 101 in the corners of the upper pole piece 36 of the magnetron assembly 22 (Figs. 1 and 14).

With the tuning unit 20 thus secured to the magnetron assembly 22 in accurately aligned relation therewith, the assembled components of the magnetron may be removed from the fixture.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for assembling and aligning components of an article, the combination of an aligning element having a cylindrical recess extending from one side thereof and forming a seat for supporting one of said components for limited rotary movement about a predetermined axis and having apertures extending from said recess through the aligning element in spaced and parallel relation to said axis for receiving projections on said component, gage means insertable in a pair of said apertures and engageable with the projections on said component for aligning the component in a predetermined position on said aligning element, said aligning element having guideways disposed parallel to said axis, a transfer member having guides engageable with the guideways on said aligning element for guiding the transfer member parallel to said axis into engagement with said component and with the guides in a predetermined relation thereto, means for removably securing said transfer member to said aligning element, and means for removably securing said component to said transfer member.

2. In a device for assembling components of a magnetron including a tuning component having a plurality of parallel pins extending from one end thereof, the combination of an aligning element having a cylindrical recess extending from one side thereof and forming a seat for supporting the tuning component for limited rotary movement about a predetermined axis and having a plurality of apertures of larger diameter than the said pins extending parallel to said axis and in spaced relation thereto from the bottom of the recess and through the aligning element for receiving the pins of the tuning component, means insertable in a plurality of the apertures in the aligning element and engageable with the pins on the tuning component for coaxially aligning the pins and the apertures and locating the tuning component in a predetermined position on the aligning element, said aligning element having a plurality of guide apertures disposed parallel to said axis, a transfer member having a plurality of guide posts slidably engageable in said guide apertures for guiding the transfer member into engagement with the tuning component in said aligning element, and means on said transfer member for releasably securing the tuning component thereto in aligned position.

3. In a device for assembling components of a magnetron including a tuning component having a plurality of parallel pins extending from one end thereof, the combination of an aligning element having a cylindrical recess extending from one side thereof and forming a seat for supporting the tuning component for limited rotary movement about a predetermined axis and having a plurality of apertures of larger diameter than the said pins extending parallel to said axis and in spaced relation thereto from the bottom of the recess and through the aligning element for receiving the pins of the tuning component, means insertable in a pair of said apertures in the aligning element and engageable with the pins on the tuning component for coaxially aligning the pins and the apertures and locating the tuning component in a predetermined position on the aligning element, said aligning element having a pair of guide apertures disposed parallel to said axis, a transfer member having a pair of guide posts slidably engageable in said guide apertures for guiding the transfer member into engagement with the tuning component on said aligning element, means on said transfer member for releasably securing the tuning component thereto in aligned position, means on the aligning element for removably securing the transfer member to said aligning element, and means for supporting the aligning elements for rotation about a second axis disposed perpendicularly to said first named axis to permit the aligning element to be inverted to facilitate the aligning of the tuning component thereon.

4. In a device for assembling and aligning components of a magnetron including an open ended hollow magnetron body having an interior portion provided with a plurality of parallel apertures, the combination of a holder for releasably supporting the magnetron body in a predetermined position with the open end thereof accessible and with the apertures disposed parallel to a predetermined axis, a pilot plate adjustably mounted on the holder adjacent said open end of the magnetron body for movement transversely of said axis and having a plurality of pilot apertures disposed parallel to said axis, a gage member having a plurality of parallel guides engageable in the pilot apertures of said pilot plate and having a portion provided with pins disposed parallel to the guides and engageable in the apertures of the magnetron body for locating the pilot plate on the holder with the pilot apertures thereof in a predetermined position relative to the apertures in the magnetron body, and means for releasably securing the pilot plate to the holder in adjusted position.

5. In a device for assembling a magnetron tuning component with an open ended hollow magnetron body wherein the tuning component has a plurality of parallel pins and the body has an interior portion provided with a plurality of parallel apertures of larger diameter than said pins for receiving the pins, the combination of a holder having surfaces engageable with outer surfaces of the magnetron body for locating the magnetron body in a predetermined position with the open end thereof accessible and with the apertures therein disposed parallel to a predetermined axis, means for releasably securing the magnetron body on the holder in said predetermined position, a pilot plate adjustably mounted on the holder adjacent the open end of the magnetron body for movement transversely of said axis and having a plurality of guideways disposed parallel to said axis, means engageable with the apertures in the magnetron body for locating the pilot plate on the holder in a predetermined position relative to the apertures, means for releasably securing the pilot plate to the holder in adjusted position, a transfer member, means for releasably securing the tuning component in a predetermined position on the transfer member, and guide elements on the transfer member slidable in the guideways of the pilot plate for guiding the tuning component parallel to said axis into the magnetron body with the pins on the tuning component in coaxial alignment with the apertures in the magnetron body.

References Cited in the file of this patent

UNITED STATES PATENTS

| 2,317,031 | Cotman et al. | Apr. 20, 1943 |
| 2,428,958 | Bohaboy et al. | Oct. 14, 1947 |
| 2,527,150 | Quinlan | Oct. 24, 1950 |
| 2,563,468 | Hroch | Aug. 7, 1951 |